3,149,053
MALTING PROCESS

Eric Kneen, Elm Grove, and John G. Fleckenstein, Brookfield, Wis., assignors to Kurth Malting Company, Milwaukee, Wis., a corporation of Wisconsin
No Drawing. Filed Dec. 11, 1962, Ser. No. 243,736
18 Claims. (Cl. 195—70)

This invention relates to malt and processes of producing malt. More particularly, this invention is concerned with a novel malting process which gives improved recoveries, or yields, of malt.

This application is related to United States patent application Serial No. 38,714, filed June 27, 1960, now United States Patent 3,085,945, and is directed to improvements in the process and products of that application.

It is well known that cereal grains such as barley, rye, oats and wheat can be germinated, i.e., malted, to modify the kernel structure, composition and enzyme content. The resulting malts have many important uses in foods for animals and humans. Most important of all, however, is malted barley which is a basic material used in the brewing and distilling industries.

The production of malt from barley can be considered as consisting of four main steps.

The first step is to store the barley. Freshly harvested barley does not germinate well. It must go through a period of rest and "sweating" (the giving off of water vapor and carbon dioxide) before reaching good germinating energy and capacity. About 30 to 60 days storage is sufficient to condition the barley for germination.

The second main step is to "steep" the barley kernels in water, which may or may not be aerated. During steeping respiration of the kernels becomes noticeable and heat and gases are given off although no significant growth takes place. The barley kernels are steeped from two to three days in water at about 50–65° F. to ensure penetration of water into the barley and generally until a moisture content of approximately 35–45% is reached. This is usually done in several stages and advisably designated as first, second and third steeps. When the steeping is completed the white tips of the barley rootlets should not be more than just appearing ("chitting").

The third main step is the germination of the barley kernels. Germination broadly involves subjecting the steeped barley to appropriate conditions of temperature, moisture and oxygen supply for a time sufficient for the interior portion of the barley kernel (the endosperm mass) to be made porous and growth facilitated. Growth starts slowly at the embryo end of the kernel the first day with the growth being accelerated the second day, which is usually when additional water is given to the germinating grain. The barley kernel begins to "chit" at the base of the kernel by showing a white tip. Rootlets then grow outwardly away from the tip. The "acrospire" also starts from the base of the kernel and grows under the hull toward the top end of the kernel. The kernels give off considerable heat and carbon dioxide which are taken from the grain by air currents. Air entering the germinating compartment usually approximates 52–60° F. in order to maintain the germinating grain between 60–70° F. When the acrospire has grown from three quarters to the full length of the kernel the enzymes and enzymatic system of the barley usually have been developed and conditioned so that it will subsequently function as malt to convert (a) starches to dextrins and sugars and (b) insoluble proteins to soluble proteins during mashing operations in a brewery or distillery, and (c) provide a source of desirable taste and aroma which carries through into the finished product, such as beer.

In the fourth step, the germinated green malt is kilned to reduce its moisture content and to stop further growth. The dried malt is cleaned and stored. Cleaning usually removes the rootlets, loose hulls and broken kernels.

The barley malt differs from the barley grain in a number of respects. It contains less moisture, and is more suitable for storing and grinding. Also, the endosperm has been modified and is mellow compared to the hard endosperm of the original barley kernel and the enzymatic values of the malt are greatly increased compared to those of the original barley grain. The barley malt now has flavor and aroma and is readily extracted and converted. Similar conversions take place in the malting of other cereal grains or legumes.

The efficiency of the malting process is evaluated normally by comparing the bushels of malt obtained per bushels of grain used. Thus, 1 bushel of barley usually will yield a maximum of about 1.18 to 1.20 bushels of malt. If the malting operation could be made completely efficient, 1.31 to 1.32 bushels of malt would be obtained per bushel of barley. Although more bushels of malt are obtained than bushels of barley started with, it must be noted that 1 bushel of barley weighs 48 pounds and 1 bushel of malt weighs 34 pounds.

Losses in the malting operation take place in each step. The main losses are about a 1% by weight loss of solids in steeping, a 5 to 8% loss during respiration through the formation of carbon dioxide and water and a 3 to 5% loss in weight in rootlets and loose husks. There is also the normal loss in moisture due to drying.

Gibberellic acid alone is used commercially in some malting processes but its use is limited by the reduced recoveries of malt obtained. The increased growth induced by gibberellic acid increases losses by respiration and rootlet growth and these losses are not overcome by a reduction in malting time or other gains.

In United States Patent No. 2,698,275, issued December 28, 1954, there is described a malting process in which chitted grain (barley) is acidulated, such as with sulfuric acid, and then treated with a plant growth inhibiting hormone. The process is reported to lower losses due to respiration and rootlet growth without reducing the malt extract. The resulting losses, however, are still apparently high and appear to amount to from about 70% to almost 90% of the control losses.

The malting process of pending application Serial No. 38,714, filed June 27, 1960, broadly comprises acidulating a cereal grain, as well as contacting the cereal grain with a growth-stimulating amount of gibberellic acid, in the period from initial steeping to the growth or germination stage prior to any significant growth or germination, viz, usually within about 6 hours, and as much as 1 day, or slightly longer, after steep out, and thereafter completing the germination.

By "acidulating" is meant applying an acidic substance to the grain, such as by spraying or immersing the grain in an aqueous solution of the acidic substance to inhibit growth. The acidic substance can be incorporated in the steep water at any stage of the steeping operation or it can be applied to the grain at steep out or thereafter and before any significant growth or germination has resulted, viz, within about 6 hours and as much as 1 day or slightly longer after steep out. However, malt recoveries are generally progressively lowered as the acidulation treatment is delayed after steep out. Nevertheless, the malt recoveries generally obtained after such tardy or deferred acidulation are higher than without such treatment.

Acidulation without the addition of gibberellic acid to the grain inhibits growth but the grain is not converted to usable malt, especially at low pH values below 3.8.

Gibberellic acid alone without acidulation promotes growth but losses due to respiration and rootlets are excessive.

The combination of acidulation and gibberellic acid greatly inhibits respiration and practically totally inhibits rootlet growth while simultaneously stimulating hydrolytic enzyme systems which convert the grain into malt. This can be best seen by reference to Table A which gives loss data for (1) a typical commercial malt, (2) an experimental untreated control malt, (3) a malt made with a combination of acidulation and gibberellic acid treatment, and (4) a barley which has been steeped and kilned without germination.

TABLE A

| | Barley 11% Moisture, Gms. | Malt 4% Moisture, Gms. | LOSSES (Gms.) | | | | Recovery Ratio, bu./bu. Malt to Barley |
|---|---|---|---|---|---|---|---|
| | | | Moisture | Steeping and Abrasion | Rootlets | Respiration | |
| (1) | 100 | 85.0 | 7.6 | 1.0 | 2.4 | 4.0 | 1.20 |
| (2) | 100 | 82.8 | 7.7 | 1.0 | 3.2 | 5.3 | 1.17 |
| (3) | 100 | 90.4 | 7.4 | 1.0 | 0 | 1.2 | 1.28 |
| (4) | 100 | 91.7 | 7.3 | 1.0 | 0 | Trace | 1.29 |

Table A shows that the losses due to respiration and rootlets in the malting process in which acidulation and gibberellic acid are employed are much less than in commercial malt or untreated malt and are very close to those obtained when barley is steeped and kilned without germination or conversion to malt. The process almost reaches the ultimate object of going from grain to malt without loss. The loss due to steeping and abrasion is presently considered unavoidable but negligible.

Acidulating of the grain can be effected with a wide variety of acidic substances although the strong to moderately strong inorganic and organic acids are advisably employed including the mineral acids such as sulfuric acid, nitric acid, hydrochloric acid, perchloric acid and phosphoric acid and monocarboxylic acids such as acetic acid, monochloroacetic acid, trichloroacetic acid and lactic acid. In addition, acidulation can be achieved with acid salts such as sodium or potassium acid sulphate, diacidphosphate and superphosphate.

As shown in application Serial No. 38,714 referred to supra, very small amounts of acid or an acid salt are needed to acidulate the grain. In effecting acidulation in the steeping stage sufficient acid or an acid salt is advisably incorporated in the steep water to bring the pH below 4 and particularly in the pH range of 1 to 3. Conventional steeping gives a pH of about 6.3 or higher.

The quantity of acidic substance (acid or acid salt but not including gibberellic acid) needed to effect acidulation of the grain can be determined as follows: Measure the amount of acidic substance which is bound or held by a 50 g. sample of acidulated green malt germinated for one day upon mixing with 50 ml. of water and standing for one hour. The solution should have a pH of about 2 to 6.

In addition to gibberellic acid its growth promoting chemical equivalents and derivatives can be employed such as the alkali metal and alkaline earth metal salts thereof, alkyl esters thereof and particularly the methyl, ethyl, propyl and butyl esters, as well as acyloxy derivatives thereof such as acetyl gibberellic acid. The term "gibberellic acid" as used herein and in the claims is intended to include the free acid as well as chemical equivalents thereof which function satisfactorily in the process.

It is disclosed in application Serial No. 38,714 supra that very small amounts of gibberellic acid are needed in the malting process, and that, based on the weight of the barley, from about 1 to 3 p.p.m. are adequate and that the gibberellic acid can be applied during any of the steeping stages or at steep out prior to significant germination.

The process using both gibberellic acid and acidulation can be used to make malt of cereal grains including barley, rye, wheat and oats. The malts can be used in food stuffs as well as the brewing and distilling industries.

The malt produced by the process described in application Serial No. 38,714, filed June 27, 1960, was obtained in good yield and generally of good quality, but some undesirable features were encountered including:

(a) A tendency of the dry, finished malt to develop rancidity during storage.

(b) The modification of the barley sometimes proceeded with increased levels of soluble protein materials being produced. High levels of soluble protein are undesirable in malt used for brewing, since beer from this type of malt often shows off-flavor, lower foam retention, and tends to be less stable during transportation and storage. Furthermore, when the soluble protein is high in the malt it becomes difficult to dry the malt without excessive caramel-like color developing.

(c) The malt sometimes developed a husk brittleness, and other changes occurred, which gave difficulty in the lautering process when the malt was brewed into beer. The wort "run-off" was often retarded significantly.

(d) During the germination, or modification, stages of the conversion of barley to malt, the low pH inhibited some of the natural microorganisms, but allowed the browth of yeasts and molds, especially yeasts. As a result, the flavor and odor of the malt sometimes became "yeasty" and somewhat undesirable.

According to the present invention novel improvements on the malting process using the combination of gibberellic acid and acidulation, or in some cases acidulation without gibberellic acid addition, are provided which obviate undesirable features which are otherwise sometimes obtained. The malt obtained using the improvements herein disclosed is very similar in chemical analysis, flavor, appearance and use performance to malt made in the conventional manner without either gibberellic aicd or acidulation, without any reduction in the increased yields of malt.

One of the improvements provided by this invention is the use, and advisably contemporaneously with or in conjunction with the acidulation step, of sodium or potassium metabisulfite or sodium or potassium bisulfite in the process from initial steeping to through the germination stage as a bacteriostatic agent to help control and suppress the microorganisms, especially the yeasts and other fungi whose growth on the green malt is undesirably permitted or allowed by the lower pH that results from acidulation. The growth of yeasts and formation of slime is suppressed in this manner and a malt is obtained having a fresh malty odor and a bright appearance.

When added to the steep water, and desirably in the first steep water, it is advisable to use contemporaneously with the acidulation, about 1000 to about 4000 parts of sodium or potassium metabisulfite or sodium or potassium bisulfite per million parts of cereal grain (i.e., barley) on a dry weight basis. One or more treatments during steeping can be used. When the treatment is effected during the germination stage, but contemporaneously with acidulation, it is advisable to use one or more applications of about 100 to about 1000 parts of sodium or potassium metabisulfite or sodium or potassium bisulfite per million parts of dry cereal grain, such as barley. A greater advantage is usually achieved by means of the bacteriostatic treatment during germination because less material is needed then than during steeping. Also, less acid is required to acidulate during germination than during steeping so the addition of acid and bacteriostatic agent are each maintained low simultaneously.

The treatment can be readily effected during steeping by incorporating at least one of such bacteriostatic agents in the steep water. When the bacteriostatic agent is added during germination it can be first dissolved in water and the resulting solution applied to the germination grain.

A second improvement provided by this invention in the malting process using the combination of gibberellic acid and acidulation is the neutralization of the acidulated grain at a time subsequent to the acidulation step and prior to kiln drying of the green malt. By neutralizing the cereal grain after acidulation and before kilning, excessive change of the husk is suppressed and, as a result, there is obtained a malt which, when used in brewing, permits ease of lautering (run-off) and good wort flavor and which can be stored for long periods without rancidity developing.

Although any suitable physiologically acceptable nondeleterious basic substance can be used in the neutralization, it has been found that the most suitable neutralizing agent is an inorganic base and, desirably, an alkali metal or alkaline earth metal hydroxide, carbonate or bicarbonate, and particularly calcium hydroxide.

The neutralization should not be effected after acidulation until the acid has been in contact with the barley, or other cereal grain, sufficiently long to inhibit the growing processes involved in respiration and rootlet growth, but still soon enough to prevent the acid from modifying the husk excessively and causing other constituent changes which lengthen "run-off" during brewing. In general, the neutralization step is advisably not effected until after the barley, or other cereal grain, has been acidulated for about six hours and desirably not until about eighteen hours after the grain is placed in initial contact with the acid used in the acidulation. The neutralization can, however, be carried out just prior to kilning. When the neutralization is effected too early in the process, there subsequently can be respiration and rootlet growth and, as a result, a commensurate loss in malt yield. On the other hand, the quality of the malt can be lowered when the neutralization is effected very late in the process so that lautering run-off is slowed and wort flavor altered. The optimum time for neutralization is in the area of about twenty-four hours after acid treatment but this time will vary depending upon the amount of acid used in the acidulation. With high levels of acid, lower acidulation contact times can be employed and the neutralization effected earlier than when lower levels of acid are used. Usually, however, neutralization is advisably effected after about 18 hours, and prior to 30 hours, subsequent to initial acidulation.

According to another improvement in the process, the levels of the acid used for acidulation as well as the amount of gibberellic acid used are reduced significantly and are employed in cooperative low level ratios which permit the production of malt in increased yields and which lead to a product of exceptionally high quality.

By using low levels of acid, and acidulating during germination in about the range of pH 1.5 to 6, such as by use of from about 1400 to 6000 parts of sulphuric acid per million parts of dry barley (about 0.25 to 1.0 ml. of conc. sulphuric acid per 350 gm. of barley) the respiration and rootlet growth can be sufficiently inhibited for up to and including four days germination, although for longer germinating times, higher levels of acid would probably be needed. Simultaneously with the use of low levels of acid during germination one can use lower amounts, such as below 0.75 p.p.m., of gibberellic acid at the same time since the two effects of these materials are roughly opposing and roughly proportional. Acid levels of about 1400 to 3000 parts of sulphuric acid per million, and gibberellic acid levels of about 0.05 to 0.4 part per million, on a dry weight of barley basis are generally satisfactory working ranges for this improvement especially when used after steep out and in the germination stage. By the use of lower levels of acid for the acidulation the germination time can be shortened from the usual five days to four days, and often less.

The resulting malt obtained by use of the described improvements is very similar in physical and malting properties to conventional malt but it has no, or essentially no, rootlets. The product is obtained in high yields, is well modified and has an acceptacle alpha-amylase value. It is stable to prolonged storage without development of rancidity, has a fresh malty odor, is bright in appearance, has no yeasty odor and has good brewing properties. The husks have conventional properties, are not brittle and form a highly suitable filter bed in lautering without retarding run-off. The soluble protein content of the malt is similar to that of conventional malts and perceptibly lower than is obtained using the gibberellic acid-acidulation malting process without these improvements, and particularly the lower levels of gibberellic acid.

The following examples are presented to illustrate the invention. The general procedure of steeping, acidulation gibberellic acid treatment, germination and kilning of the malts shown in the examples was essentially as follows unless stated otherwise therein:

Samples of barley (sample size depending upon the germination equipment used, ranging from 100 g. to 10,000 g. dry weight of barley (generally midwestern malting varieties) were steeped in water in the temperature range of 55° to 62° F. for 20 hours, and then allowed to drain (couch) for about 2 hours (moisture content at this stage is in the range of 38 to 42%). The acid and gibberellic acid were sprayed on the steeped barley in separate dilute solutions, using sufficient dilution to bring the moisture content of the steeped barley up to 44% after the solutions are sprayed separately, but simultaneously, into the barley. The treated barley was allowed to germinate in a suitable container with adequate aeration with humidified air in the temperature range of 59° to 62° F. The germinating samples were generally treated with water to keep the moisture at the 44% level, or treated with other solutions such as a solution of sodium metabisulfite or calcium hydroxide at 24, 48 and/or 72 hours germination time. After 72 hours or 84 hours, as the case may be, germination time the green malt was carefully kiln dried, with or without a small amount of sulphur dioxide mixed into the drying air during the first hour of drying. Generally the kilning times and temperatures were: 20 hours at 110° to 115° F., 20 hours at 120° F., and 2 to 4 hours at 175° F., all drying using an abundance of air. The yield of the dry weight malt was calculated based on the weight of the dry weight barley. Unless otherwise stated weights are based on dry barley used in the process.

*Example 1.—Effect of Neutralization and/or Drenching During Germination*

2400 p.p.m. $H_2SO_4$ added at steep-out.
0.1 p.p.m. gibberellic acid added at steep-out.
Germination for 4 days (60° F.).
All additions on a dry barley basis.

|   | Treatment During Germination | Storage Stability of Malt at 80° F. |
|---|---|---|
| 1 | Water to 44% moisture at 24, 48, and 72 hours. | Rancid in 15 days. |
| 2 | Drenched with water at 24, 48, and 72 hours. | Slight rancidity in about 90 days. |
| 3 | Neutralized with $Ca(OH)_2$ at 72 hours. | No evidence of rancidity in 6 months. |
| 4 | Drenched as in No. 2 at 24, and 48 hours and neutralized with $Ca(OH)_2$ at 72 hours. | Do. |

*Example 2.—Effect of Adding Sodium Metabisulfite to Germinating Malt to Prevent Yeast Growth*

2500 p.p.m. $H_2SO_4$ added at steep-out.
0.2 p.p.m. gibberellic acid added at steep-out.
Germination for 4 days at 62° F.
All additions on dry barley basis.

| Treatment During Germination | Odor and Appearance of the Green Malt in 4 Days |
|---|---|
| No treatment, except watering to 44% moisture. | Strong yeasty odor and slime-like feel. |
| 500 p.p.m. sodium metabisulfite at 24, 48, and 72 hours. | Fresh malty odor—no slime. |
| 3,000 p.p.m. sodium metabisulfite in first steep water, and 500 p.p.m. at 24, and 48 hours, neutralized acid with $Ca(OH)_2$ at 72 hours. | Fresh malty odor, bright appearance and no slime. |

*Example 3.—Effect of Neutralization and Sodium Metabisulfite on Malt Quality*

2700 p.p.m. $H_2SO_4$ added at steep-out.
0.2 p.p.m. gibberellic acid added at steep-out.
Malt germinated for 4 days.
$Ca(OH)_2$ used in the neutralization[1].
Sodium metabisulfite used as a yeast inhibitor.
All additions on a dry barley basis.

| Interval (hours) | Treatment During Germination ||||||
|---|---|---|---|---|---|---|
| | Sample A || Sample B || Sample C ||
| | Neutralization | Inhibitor (p.p.m.) | Neutralization | Inhibitor (p.p.m.) | Neutralization | Inhibitor (p.p.m.) |
| 24 | Complete. | | | 150 | One-third. | |
| 36 | | 300 | | 150 | | 300 |
| 48 | | 400 | Complete. | | One-third. | |
| 60 | | | | 300 | | 300 |
| 72 | | 300 | | 300 | One-third. | |
| 84 | | | | | | 300 |
| 88 | Water wash. | | Water wash. | | Water wash. | |

The pH values (50 g. barley in 50 ml. $H_2O$, measure in 1 hour) of the acid treated, steeped barley, before and after neutralization with calcium hydroxide were as follows:

| | pH |
|---|---|
| Steeped barley | 6.05 |
| Acidified: | |
| Initial | 1.80 |
| After 24 hrs. | 2.65 |
| Neutralized: | |
| Initial | 7.15 |
| After 24 hrs. | 6.65 |
| After 48 hrs. | 6.35 |

MALT ANALYSES

| Sample | Alpha Amylase[1] (units) | Modification Index[3] | Soluble Protein[2] (percent) | Malting Yield (percent) |
|---|---|---|---|---|
| A | 33 | 35 | 6.14 | 97.0 |
| B | 25 | 32 | 6.66 | 97.4 |
| C | 28 | 32 | 6.32 | 97.0 |

[1] Methods of Analysis of the American Society of Brewing Chemists, 6th Ed., page 169 (1958), American Society of Brewing Chemists, Madison 5, Wisconsin. Brewers' malt can have an alpha-amylase value of about 25 to 40, with distillers' malt having higher values.
[2] Soluble protein is expressed as percent of the dry weight of the malt as protein which is soluble in the wort. When the total protein of the malt is 13.5 percent or more, a soluble protein range of about 6.0 to 6.5 percent is quite acceptable for brewers' malt.
[3] The Modification Index is a measure of the conversion of the barley, or other grain, to malt. The higher the value, the greater is the conversion into malt. Malts have modification index values of about 25 to 50 (and higher) while barley has a value less than 2. The modification index provides similar information as the wort viscosity and coarse-fine difference determinations.
[1] The neutralization procedure was to mix into the malt a solution of calcium hydroxide containing either stoichiometric levels (complete), or one-third stoichiometric level, as the case may be.

All three samples of malt showed excellent storage stability (not rancid after 6 months), and the green malt smelled clean and free from yeast and slime. The flavor and brewing properties of all three samples were very good and equivalent or better than malt produced in the conventional way with rootlet growth, respiration, and lower malting yields.

$$\text{Modification index} = 100 \times \frac{1}{\text{TCA viscosity}}$$

TCA viscosity is determined as follows:

A 25 gm. sample of malt is finely ground (Miag Cone Mill, setting 95). A flask is heated to approximately 68° C., 25 mls. of 40% trichloroacetic acid is added and then 200 mls. of hot tap water. The mixture is cooled to 68° C., the 25 gm. of malt added and the mixture blended 2 minutes and filtered.

A viscosimeter is cooled to 20° C. and a 10 ml. sample of the malt dispersion is added. After cooling to 20° C. the running time is recorded. This is then repeated.

The water time of the viscosimeter is measured by adding 10 ml. of distilled water to a clean, drained viscosimeter and the running time measured at 20° C.

The viscosity is then calculated as follows:

$$\text{TCA viscosity} = \frac{\text{Running time of malt solution}}{\text{Running time of water}}$$

*Example 4.—Gibberellic Acid Levels*

3000 p.p.m. $H_2SO_4$ added at steep-out.
Gibberellic acid added at steep-out.
Malt germinated for 4 days.
All additions on a dry barley basis.

| Level of Gibberellic Acid Added (p.p.m.) | Alpha Amylase (units) | Modification Index | Malting Yield (percent) |
|---|---|---|---|
| 0.0 | 6.0 | <20 | 96.2 |
| 0.1 | 30.0 | 42 | 95.8 |
| 0.2 | 37.0 | 48 | 96.5 |
| 0.3 | 42.0 | 47 | 95.6 |

*Example 5.—Gibberellic Acid Levels*

2400 p.p.m. sulfuric acid added at steep-out.
Gibberellic acid added at steep-out.
Malt germinated for 3 days.
All additions on a dry barley basis.

| Level of Gibberellic Acid Added (p.p.m.) | Alpha Amylase (units) | Soluble Nitrogen (percent) | Modification Index | Malting Yield (percent) |
|---|---|---|---|---|
| 0.1 | 17 | 5.98 | | 98.6 |
| 0.2 | | | 23.5 | 98.6 |
| 0.4 | 31 | 7.92 | 23.0 | 98.6 |
| 1.0 | 35 | 8.16 | 27.5 | 97.6 |
| 2.0 | 37 | 8.65 | | 95.5 |

*Example 6.—Acid Levels (60° F.)*

0.2 p.p.m. gibberellic acid added at steep-out.
Sulfuric acid added at steep-out.
Malt germinated for 4 days.
All additions on a dry barley basis.

| Acid Level (p.p.m.) | Alpha Amylase (units) | Modification Index | Malting Yield (percent) |
|---|---|---|---|
| 1,000 | 34 | 35.5 | 93.8 |
| 2,000 | 29 | 39 | 96.5 |
| 2,500 | 25 | 38 | 97.0 |
| 3,000 | 23 | 41 | 97.7 |

Various changes and modifications of the invention can be made and, to the extent that such variations incorporate the spirit of this invention, they are intended to be included within the scope of the appended claims.

What is claimed is:

1. In the process of producing malt from a cereal grain which uses gibberellic acid and an acidulation treatment of the cereal grain in the period from initial steeping of the grain to before significant germination of the steeped grain begins, the process improvement which comprises substantially neutralizing the cereal grain being malted after the acidulating action has served to retard rootlet growth and prior to kilning.

2. In the process of producing malt from a cereal grain which uses gibberellic acid and an acidulation treatment of the cereal grain after steep-out and before significant germination of the steeped grain begins, the process improvement which comprises substantially neutralizing cereal grain being malted in the period from about 6 hours after acidulation is completed to prior to kilning.

3. The process improvement according to claim 2 in which calcium hydroxide is used for the neutralization and the cereal grain is barley.

4. The process improvement according to claim 2 in which the neutralization is effected within 30 hours after acidulation is completed.

5. In a process of producing malt which uses an acidulation treatment of the cereal grain being malted, the process improvement which comprises treating the cereal grain with a small but effective and safe amount of a bacteriostatic agent in conjunction with the acidulation to control and suppress the growth of yeasts, molds and other undesirable microorganisms whose growth would otherwise be allowed by the acidulation.

6. The process improvement according to claim 5 in which the bacteriostatic agent is a member selected from the group consisting of sodium bisulfite, potassium bisulfite, sodium metabisulfite and potassium metabisulfite.

7. In a process of producing malt which uses an acidulation treatment of the cereal grain being malted, the process improvement which comprises treating the cereal grain with about 100 to 4000 parts, per million of cereal grain, of a bacteriostatic agent selected from the group consisting of sodium bisulfite, potassium bisulfite, sodium metabisulfite, and potassium metabisulfite in conjunction with the acidulation to control and suppress the growth of yeasts, molds and other undesirable microorganisms whose growth would otherwise be allowed by the acidulation.

8. The process of claim 7 in which the cereal grain is barley.

9. In the process of producing malt from a cereal grain which uses gibberellic acid and an acidulation treatment of the cereal grain in the period from initial steeping of the grain to before significant germination of the steeped grain begins, the process improvement which comprises treating the cereal grain with a small but effective and safe amount of a bacteriostatic agent in conjunction with the acidulation to control and suppress the growth of yeasts, molds and other undesirable microorganisms whose growth would otherwise be allowed by the acidulation.

10. In the process of producing malt from a cereal grain which uses gibberellic acid and an acidulation treatment of the cereal grain in the period from initial steeping of the grain to before significant germination of the steeped grain begins, the process improvement which comprises treating the cereal grain with about 100 to 4000 parts, per million of cereal grain, of a bacteriostatic agent selected from the group consisting of sodium bisulfite, potassium bisulfite, sodium metabisulfite and potassium metabisulfite in conjunction with the acidulation to control and suppress the growth of yeasts, molds and other undesirable microorganisms whose growth would otherwise be allowed by the acidulation.

11. The process of claim 10 in which the cereal grain is barley.

12. The process of malting which comprises acidulating a cereal grain in the period from initial steeping of the grain to before significant germination of the steeped grain begins, treating the cereal grain during acidulation with a small but safe and effective amount of a bacteriostatic agent to control and suppress the growth of yeasts, molds and other undesirable microorganisms whose growth would otherwise be allowed by the acid conditions of the acidulation, substantially neutralizing the acidulated cereal grain being malted after the acidulating action has served to retard rootlet growth but prior to kilning, germinating the grain until it is modified to malt, and drying the resulting green malt.

13. The process of claim 12 in which the bacteriostatic agent is selected from the group consisting of sodium bisulfite, potassium bisulfite, sodium metabisulfite and potassium metabisulfite and is used in an amount of from about 100 to 4000 parts by weight per million of cereal grain.

14. The process of malting which comprises both acidulating and adding a growth promoting amount of gibberellic acid to a cereal grain in the period from initial steeping of the grain to before significant germination of the steeped grain begins, treating the cereal grain during acidulation with a small but safe and effective amount of a bacteriostatic agent to control and suppress the growth of yeasts, molds and other undesirable microorganisms whose growth would otherwise be allowed by the acid conditions of the acidulation, substantially neutralizing the acidulated cereal grain being malted after the acidulating action has served to retard rootlet growth but prior to kilning, germinating the grain until it is modified to malt, and drying the resulting green malt.

15. The process of claim 14 in which the bacteriostatic agent is selected from the group consisting of sodium bisulfite, potassium bisulfite, sodium metabisulfite and potassium metabisulfite and is used in an amount of from about 100 to 4000 parts per million of cereal grain by weight.

16. The process of claim 14 in which the neutralization is effected with calcium hydroxide.

17. The process of malting according to claim 14 in which not more than 0.75 part by weight of gibberellic acid are used per million parts of cereal grain, and the cereal grain is barley.

18. The process of malting which comprises both acidulating barley with about 1400 to 6000 parts of sulphuric acid per million parts of dry barley and adding a growth promoting amount of gibberellic acid up to 0.75 part per million parts of dry barley to a steeped cereal grain prior to significant germination of the barley, treating the barley during acidulation with about 100 to 4000 parts, per million parts of dry barley, of a bacteriostatic agent selected from the group consisting of sodium bisulfite, potassium bisulfite, sodium metabisulfite and potassium metabisulfite to control and suppress the growth of yeasts, molds and other undesirable microorganisms whose growth would otherwise be allowed by the acidulation, substantially neutralizing the acidulated cereal grain being malted with calcium hydroxide after the acidulating action has served to retard rootlet growth but prior to kilning, germinating the grain until it is modified to malt, and drying the resulting green malt.

References Cited in the file of this patent

UNITED STATES PATENTS

| 2,798,811 | Bockelmann et al. | July 9, 1957 |
| 2,960,409 | Macey et al. | Nov. 15, 1960 |

FOREIGN PATENTS

| 28,884/30 | Australia | Sept. 8, 1930 |
| 6,337 | Great Britain | Aug. 30, 1890 |
| 811,374 | Great Britain | Apr. 2, 1959 |

OTHER REFERENCES

Urquhart: "Note on Some Experimental Steeping Treatments of Malting Barley," J. Inst. Brew., vol. 59, 1953, pp. 56–58.